July 5, 1966  C. L. BLAIR  3,259,395
FIGURE SIMULATING ATTACHMENT FOR BICYCLES
Filed July 24, 1964  2 Sheets-Sheet 1
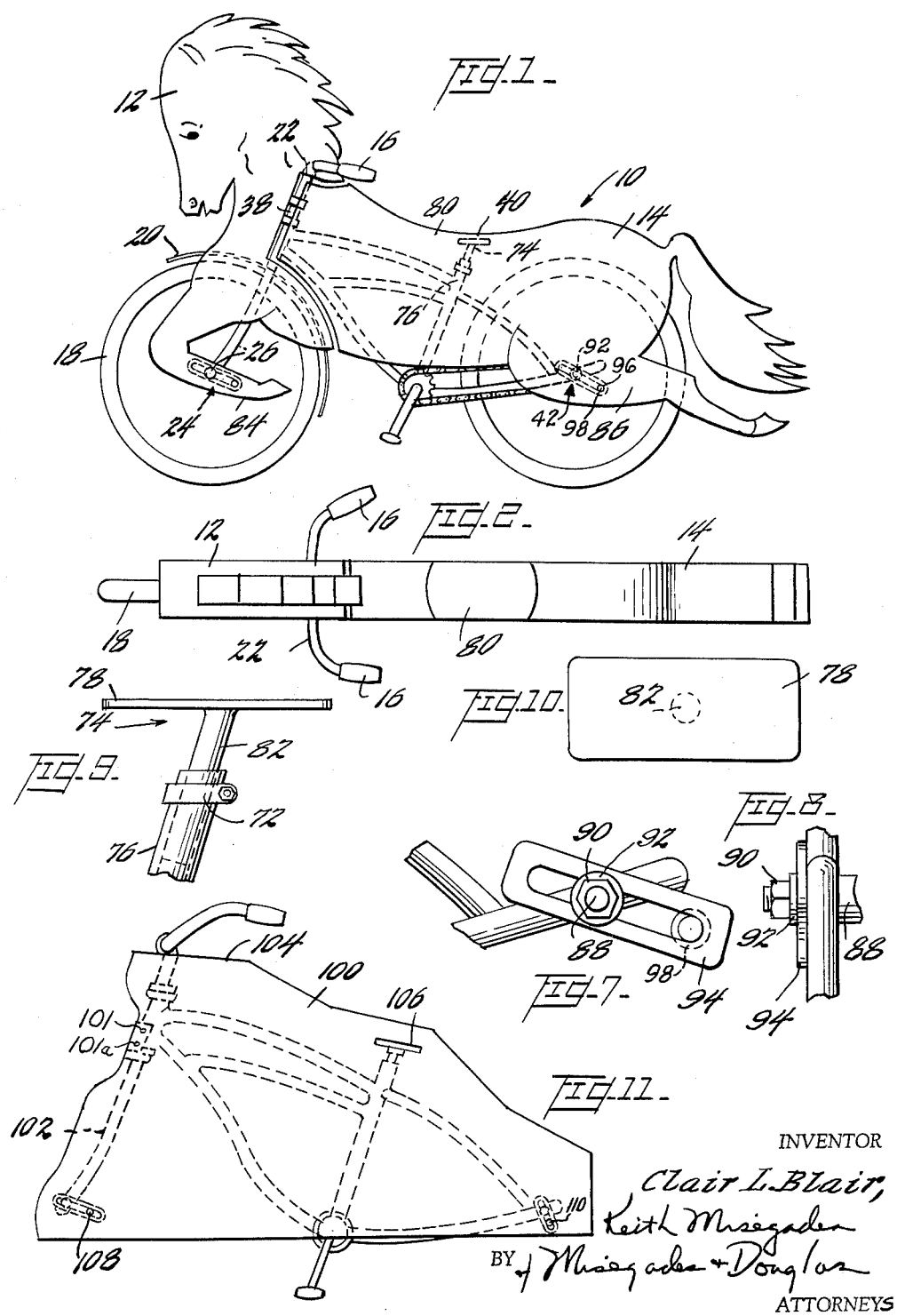
INVENTOR
Clair L. Blair,
Keith Misegades
BY Misegades + Douglas
ATTORNEYS July 5, 1966
C. L. BLAIR
3,259,395
FIGURE SIMULATING ATTACHMENT FOR BICYCLES
Filed July 24, 1964
2 Sheets-Sheet 2
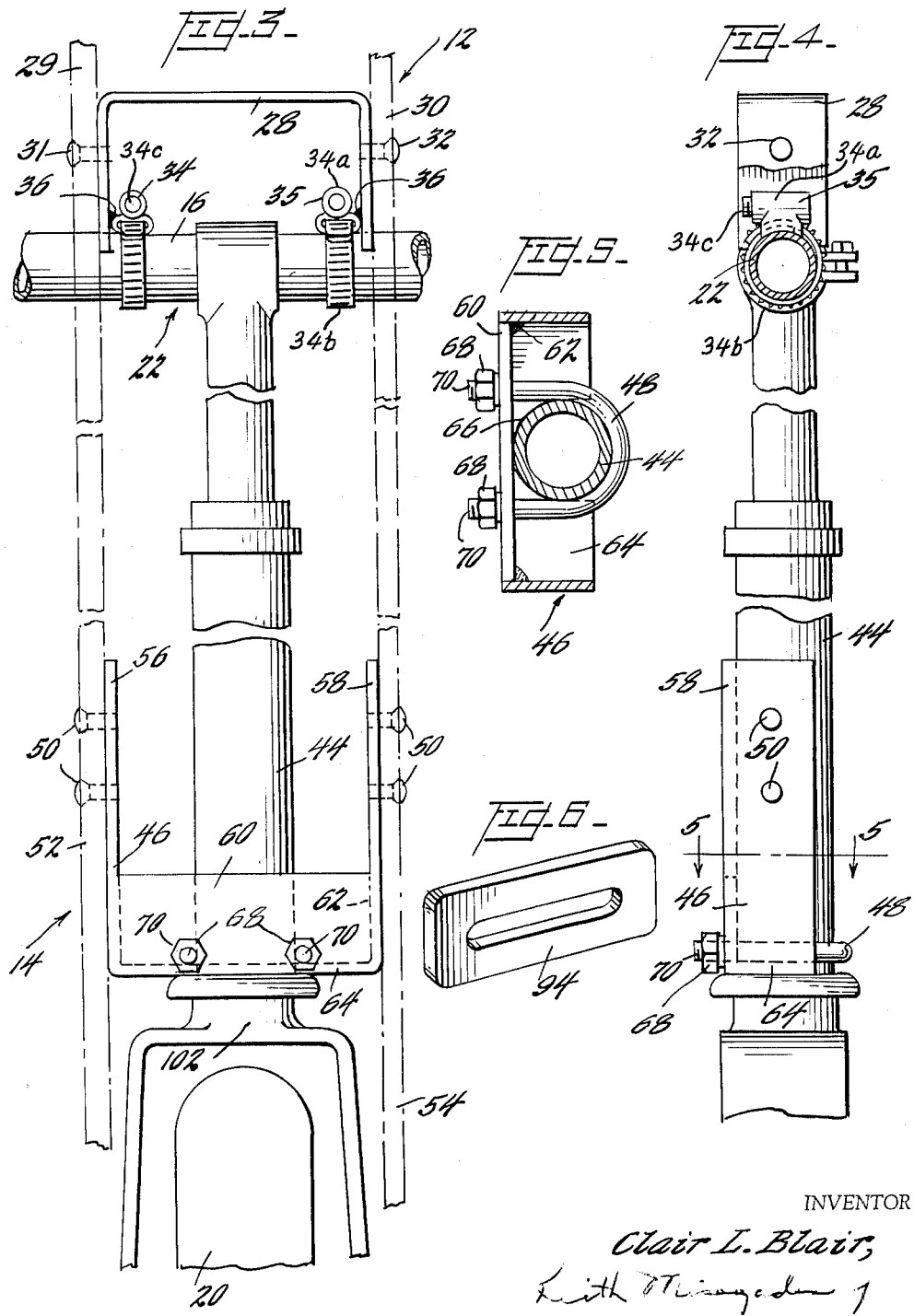
INVENTOR
Clair L. Blair;
BY
ATTORNEYS 3,259,395
FIGURE SIMULATING ATTACHMENT
FOR BICYCLES
Clair L. Blair, 3093 Myrtle St., Sioux City, Iowa
Filed July 24, 1964, Ser. No. 384,845
6 Claims. (Cl. 280—1.203)

This invention relates to attachments for bicycles, and in particular, to an attachment in the form of a figure, such as a horse, which is lightweight and easily secured to and removed from a bicycle.

Perhaps the most popular means of enjoyment for youngsters in this or any other country is the bicycle. In recent years, various attachments have been proposed to be used with bicycles to broaden the scope of enjoyment of the basic mechanism. Specifically, animal figures such as horses, have been constructed from materials such as sheet metal or plywood and attached in differing ways to the sides of bicycles so that the youngster using the same could derive enjoyment, imagining himself as some epic character of the past, such as Old West. All of these have enjoyed some measure of success, but each has specific shortcomings. Three prime deficiencies are: (a) heavy weight, (b) difficult attachment and removal, and (c) lack of adaptability of one single figure to bicycles of varying types and dimensions.

Easy removal is of utmost importance with respect to devices of the above nature, as a child's whims and desires change frequently and radically. One day he may want just a plain bicycle. The next day, he may wish to have a space ship, a house, a car, or any imaginable thing that would be ridden. Therefore, variety as well as simplicity of construction are highly desirable elements in an invention of this nature.

The most common difficulty encountered in devices of this nature is proper placement of brackets used in attaching the device to the bicycle. Therefore, a template having markings thereon corresponding to the permanent points of attachment of the device is provided. The template may be used to properly locate the attaching brackets, irrespective of the size and type of bicycle, so that the device will fit perfectly once the brackets are properly located.

Therefore, it is the principal object of this invention to provide an amusement device for attachment to a bicycle in the form of a figure which is easily attached and removed from said bicycle.

It is another object of the invention to provide an amusement figure for attachment to a bicycle which may be used on varying types and sizes of vehicles.

Yet another object is to provide a device of the above nature which is strong and lightweight in construction.

Finally, it is an object of this invention to provide an amusement device for attachment to a bicycle which is low in cost and yet of great versatility.

Further and more specific objects of this invention will become readily apparent by reference to the appended drawings in which:

FIGURE 1 is a side elevational view of the invention in the form of a horse, and attached to a common boy's bicycle;

FIGURE 2 is a top plan view of the device shown in FIGURE 1;

FIGURE 3 is an enlarged, segmented partial front view of the device of FIGURE 1;

FIGURE 4 is a side view of the device shown in FIGURE 3;

FIGURE 5 is a section view taken along lines 5—5 of FIGURE 4;

FIGURE 6 is an enlarged isometric view of one of the attaching members used on the axles of the device, and indicated by dotted lines in FIGURE 1;

FIGURE 7 is an enlarged partial side view showing one of the devices of FIGURE 6 in place on the rear axle of the bicycle;

FIGURE 8 is a partial end view of the device shown in FIGURE 7;

FIGURE 9 is an enlarged partial side view of the upper, central area of FIGURE 1, indicating the structure of the seat attachment of the bicycle;

FIGURE 10 is a top plan view of the device of FIGURE 9, and

FIGURE 11 is a partial side elevational view of the device, similar to FIGURE 1, but showing instead the use of the template for locating the attaching brackets of the device.

Referring now to the drawings by reference character, and in particular to FIGURES 1 and 2, there is shown the invention 10, in the form of a horse, comprising members 12 and 14. Member 12 comprises the forelegs, chest and head of the animal while rear member 14 comprises the body, rear legs, and tail portions of the horse. Each member is a single, whole, rigid unit, constructed of molded reinforced plastic, or like material. Thus each section is lightweight while being very sturdy, in order to survive the rigors of childhood play. FIGURE 2 shows that each member 12, 14 is constructed of flat pieces but it is quite possible to mold each section in a curved fashion, for greater comfort and realism.

Member 12 is formed so as to fit over the handle bars 16 as well as over front wheel 18, and fender 20, thus enclosing the major portion of the forward steering end of the bicycle, and is secured to the bicycle, at point 22, at handlebars 16, and points 24, 24, on either side of axle 26 of wheel 18. Attachment 22 is best shown in the upper portion of FIGURES 3 and 4. A U-shaped angle iron, 28, is shown, secured to walls 29, 30 of head member 12 by screws or rivets 31, 32. Angle iron 28 is further secured to handlebars 16 by strap fasteners 34, 35, secured to either lower projection of angle iron 28 as by welding 36. Fasteners 34, 35 each include a housing 34a, a strap 34b, and a screw 34c, threaded to the surface of strap 34b. Screw 34b is rotatably secured in housing 34a. Thus by loosening or tightening strap fasteners 34, 35, the upper portion of member 12 may be easily attached to and removed from handlebars 16. The attachment of the legs of member 12 to front axle 26 will be explained below.

The mounting of member 14 to the bicycle is accomplished at points 38, 40 and 42, indicated in FIGURE 1. Point 38 is adequately shown in the lower portions of FIGURES 3 and 4, and by FIGURE 5. Here, the forward portion of body member 14 is secured to angle iron 46 by means of screws or rivets 50 through sides 52 and 54 of body 14 and upper projections 56 and 58 of angle iron 46. A transverse flat plate 60 is secured as by welding 62 in the base portion of angle iron, at the forward end thereof, as indicated in FIGURE 5. Additionally the base portion 64 of angle iron 46 has a semicircular cut therein, indicated by line 66 in FIGURE 5, to accommodate steering column 44. U-bolt 48 is then attached through plate 60 and secured by nuts 68, 68 over threaded portions 70, 70 of U-bolt 48.

Attaching point 40 is best shown in FIGURES 1, 9 and 10. At this point, the usual seat standard which is a part of the bicycle is removed by loosening seat post lock 72. A support standard structure 74 is then inserted into seat post 76 of the bicycle. Standard structure 74 comprises, plate element 78, which is found to rest securely against the undersurface of molded seat portion 80 of body 14, and post member 82, which is secured in place within seat post 76 by post lock 72.

FIGURES 6, 7, and 8 best indicate the novel structure of attaching points 24 and 42. At these points, the fore and rear legs of the animal, 84 and 86 respectively, are attached to the front and rear axles, 26 and 88 respectively, of the bicycle. Since the construction and method of attaching these legs is precisely identical in both instances, the discussion will be confined to attaching point 42, where rear legs 86 are secured to the bicycle. First nut 90 and washer 92 are removed from axle 88 as shown in FIGURES 7 and 8, then an adjustment bracket 94 (FIGURE 6) is slipped over the axle and nut 90 with washer 92 is replaced on axle 88. Bracket 94 is then properly aligned to fit a small bore 96 in rear leg 86 of body 14 by use of the template of FIGURE 11, as explained below. Nut 90 is then tightened and leg 86 is secured to bracket 94 as by means of a nut and bolt 98. This operation is exactly the same for both sides of both axles of the bicycle.

Turning now to FIGURE 11, we will discuss the use of the template 100 which is used to properly align all of the brackets explained above so that the entire animal FIGURE 10 fits perfectly on the bicycle. Conveniently, template 100 may be printed on the side of the shipping carton used to package the invention. Assembly and alignment of the brackets used is accomplished as follows. First, bracket 46 with U-bolt 48 is securely attached to the steering column of the bicycle, just above front forks assembly 102 (FIGURE 3). Then template 100 is mounted on one side of the bicycle by means of screws or bolts 50 through upper leg 58 of bracket 46 and through holes 101 and 101a of template 100. Handlebars 16 are then adjusted vertically to just rest on edge portion 104 of template 100. Next, support standard 74 is placed on the bicycle as explained above, adjusted to meet slot 106 of template 100 and is then secured in place. Then brackets 94, 94 are placed on the axles of the bicycle, aligned with holes 108 and 110 of template 100, and secured in place. Template 100 is then removed and angle iron bracket 28 is mounted on handlebars 16. Portions 14 and 12 are then mounted on the bicycle in that order.

It may be readily seen from the foregoing that I have provided a substantial improvement in the art of amusement devices for attachment to bicycles. The range of types of figures that may be used is as wide as the scope of a child's imagination, yet the mounting of the same is as simple as possible. The invention assures that no radical changes in structure of the bicycle are necessitated while providing a simulated figure that is of maximum realistic effect. Additionally, the scope of this invention provides a simulated figure that may be attached to either a girl's or boy's bicycle, as there is no connection of the invention to the central portion of the bicycle where the principal difference of the two types of bicycles is structurally apparent.

Therefore, I am not to be limited to the exact figure or construction provided herein, except as may be within the scope of the following claims.

I claim:
1. A fanciful shaped figure for attachment to a bicycle comprising two separate, shaped elements, the first of said elements comprising a head portion, the second of said elements comprising a body portion, said first element to be attached to said bicycle at the handlebar and front axle portions thereof, means for attaching said first element to said handlebars and front axle of said bicycle, comprising a removable bracket, mounted interiorly of said first shaped element on said handlebars, and a pair of slotted plate members, adapted for location one on either side of said front axle, and adjustable therearound for proper interior attachment to the lower portions of said first element, said second element to be attached to said bicycle at the apex of the front fork, the seat post and the rear axle of said bicycle, and means for attaching said second element to said front fork, seat post and rear axle.

2. The device of claim 1 wherein said means for attaching said second element to said front fork, seat and rear axle comprise a removable bracket, mounted interiorly of said second element at the apex of said front fork, a support standard mountable on the seat post of said bicycle, vertically adjustable therein, and adapted to support the central upper portion of said second element, and a pair of slotted plate members, adapted for location one on either side of said rear axle and adjustable therearound for proper interior attachment to the rear lower extended portions of said second element.

3. A body, adapted for attachment to bicycles of varying dimensions, in the form of a shaped figure substantially covering said bicycle and having portions extending over the axles of said bicycle, connective elements securing said portions to said axles, each of said elements including wall means defining an elongated slot in said element, first connective means through said slot securing said element to said axle, and second connective means through said slot securing said element to said body, said first connective means laterally spaced from said second connective means in said slot.

4. The device of claim 3 wherein said body comprises two separate elements, one element secured to the handlebars and front axle of said bicycle, the other secured to the main frame and rear axle of said bicycle, said axles being provided with said connective link element at each longitudinal end thereof.

5. A shaped figure, adapted for attachment to bicycles of varying dimensions, securable to a bicycle to at least the axles thereof, said figure having a generally flat upper interior portion adjacent the seat support column of said bicycle, and a support standard, secured in said seat support column, said standard having a face element thereon for contacting and supporting said upper interior portion of said shaped figure.

6. The device of claim 5 wherein said support standard is vertically adjustable within said seat support column.

References Cited by the Examiner
UNITED STATES PATENTS

| | | | |
|---|---|---|---|
| 613,375 | 11/1898 | Kellogg | 280—1.188 |
| 1,906,611 | 5/1933 | Johnson | 33—197 |
| 2,187,087 | 1/1940 | Leary | 33—137 |
| 2,225,560 | 12/1940 | Hartman | 280—1.188 |
| 2,646,990 | 7/1953 | Fowler | 280—1.189 |
| 2,842,379 | 7/1958 | Campo | 280—1.204 |
| 3,017,193 | 1/1962 | Klein | 280—1.188 |
| 3,092,915 | 6/1963 | Bell | 33—180 |

LEO FRIAGLIA, *Primary Examiner.*